United States Patent [19]
Takeuchi et al.

[11] Patent Number: 6,136,249
[45] Date of Patent: Oct. 24, 2000

[54] PROCESS FOR PRODUCING AUTOMOBILE BUMPER MADE OF SYNTHETIC RESIN

[75] Inventors: Atsushi Takeuchi; Osamu Aoki; Kenji Hamabe; Tatsuya Itakura; Hitoshi Ohgane; Minoru Makuta, all of Wako, Japan

[73] Assignee: Honda Giken Kogyo Kabushiki Kaisha, Tokyo, Japan

[21] Appl. No.: 09/075,262

[22] Filed: May 11, 1998

Related U.S. Application Data

[62] Division of application No. 08/517,319, Aug. 21, 1995, Pat. No. 5,780,125.

[30]   Foreign Application Priority Data

Aug. 22, 1994 [JP] Japan ................................. 6-197048

[51] Int. Cl.$^7$ ................................................ B28B 7/22
[52] U.S. Cl. ................. 264/255; 264/328.8; 264/328.12; 264/331.13; 264/921
[58] Field of Search ...................... 264/255, 328.8, 264/328.12, 331.13, 921; 428/31, 903.3; 293/115

[56]   References Cited

U.S. PATENT DOCUMENTS

| | | | |
|---|---|---|---|
| 3,878,282 | 4/1975 | Bonis et al. | 428/903.3 |
| 5,064,724 | 11/1991 | Ofstein | 428/903.3 |
| 5,094,905 | 3/1992 | Murray | 428/903.3 |
| 5,122,398 | 6/1992 | Seiler et al. | 428/31 |
| 5,125,817 | 6/1992 | Yamachika | 425/130 |
| 5,180,629 | 1/1993 | Terada et al. | 428/31 |
| 5,276,093 | 1/1994 | Kitagawa et al. | 428/31 |

FOREIGN PATENT DOCUMENTS

| | | |
|---|---|---|
| 42 36 802 | 5/1994 | Germany . |
| 4-267114 | 9/1992 | Japan . |
| 4-334408 | 11/1992 | Japan . |
| 5-269743 | 10/1993 | Japan . |
| 6-071829 | 3/1994 | Japan . |
| 6-100726 | 4/1994 | Japan . |
| 6-170873 | 6/1994 | Japan . |

*Primary Examiner*—Jan H. Silbaugh
*Assistant Examiner*—Suzanne E. Mason
*Attorney, Agent, or Firm*—Armstrong, Westerman, Hattori, McLeland & Naughton

[57]   ABSTRACT

A process for producing a bumper of synthetic resin for use in an automobile, the bumper including a core and an outer layer covering the core. The process includes the steps of preparing a core forming material that includes a main component and a polyethylene added to the main component, the main component being produced by pulverizing a recovered bumper which has been formed using a polyolefin-based resin composition modified by an olefinic elastomer and which has a thermosetting synthetic resin coating film on its surface, and an outer layer forming material that includes the polyolefin-based resin composition modified by the olefinic elastomer and the polyethylene in a content $A_2$ which is smaller than a content $A_1$ of the polyethylene included in the core forming material ($A_2<A_1$); injecting the outer layer forming material through a feed channel into a bumper molding cavity in a mold; injecting the core forming material to flow into the outer layer forming material located in the feed channel and the cavity, and allowing the outer layer forming material and the core forming material to flow into the cavity; and pushing the outer layer forming material and the core forming material which are located in the feed channel into the cavity by the outer layer forming material thereby to form the core and the outer layer.

4 Claims, 11 Drawing Sheets

PROCESS FOR PRODUCING AUTOMOBILE BUMPER MADE OF SYNTHETIC RESIN

This application is a division of prior application Ser. No. 08/517,319 filed Aug. 21, 1995 now U.S. Pat. No. 5,780, 125.

BACKGROUND OF THE INVENTION

1. Field of the Invention

The present invention relates to a bumper for an automobile, and particularly, to a bumper made of a synthetic resin, which includes a core, and an outer layer covering the core.

2. Description of the Prior Art

There is such a conventionally known bumper which is made by pulverizing, into fine particles, a recovered bumper of synthetic resin having a thermosetting synthetic resin coating film on its surface, and using such particles as a core forming material (see Japanese Patent Application Laid-open No.267114/92).

Such a bumper is effective for providing a reduction in industrial waste, resources-saving and an environment protection, because the bumper is produced by re-utilizing the recovered bumper.

The reason for using the recovered bumper with the thermosetting synthetic resin coating film deposited thereto as the core forming material is that it is difficult to peel off the coating film from the recovered bumper, and when the peeling-off is to be carried out, much time is required for such operation, and a sanitary problem is arisen due to a solvent or the like.

However, the known bumper has a problem that when the coating film is not finely pulverized, the adhesion of bulky coating film particles to a resin matrix is deteriorated, resulting in substantially reduced mechanical characteristics, particularly, in a substantially reduced impact resistance.

SUMMARY OF THE INVENTION

It is an object of the present invention to provide a bumper made of a synthetic resin for use in an automobile, whose impact resistance can be enhanced to a level suitable for a practical use by compensating a reduction in impact resistance due to the incorporation of the coating film particles by another means, and which has a heat-resisting characteristic.

To achieve the above object, according to the present invention, there is provided a bumper of synthetic resin for use in an automobile, comprising a core and an outer layer covering the core, wherein a material for forming the core includes a main component produced by pulverizing a recovered bumper which has been formed using a polyolefin-based resin composition modified by an olefinic elastomer and which has a thermosetting synthetic resin coating film on its surface, and a polyethylene added to the main component, and a material for forming the outer layer includes a polyolefin-based resin composition modified by an olefinic elastomer and the polyethylene in a content $A_2$ which is in a relationship of $A_2 < A_1$ to the content $A_1$ of the polyethylene in the core forming material.

With the above-described bumper, if the polyethylene is added to the main component of the core forming material, the polyethylene exhibits a good compatibility to the olefinic elastomer to reinforce the latter. This makes it possible to enhance the impact resistance of the core, despite the incorporation of the coating film particles.

In this case, the heat resisting characteristic of the core is degraded with the addition of the polyethylene, because the polyethylene has a low heat resistance. However, this is compensated by the outer layer including the polyethylene in a small content and having an excellent heat resisting characteristic.

Thus, it is possible to provide a bumper made of a synthetic resin for use in an automobile, which is produced utilizing the recovered bumper and has an excellent impact resistance and an excellent heat resisting characteristic.

A polyolefin-based resin composition, which ensures that in coating the surface of the outer layer, such surface is not required to be subjected to a degreasing by an organic solvent such as 1,1,1-trichloroethane and the like, can be selected as the outer layer forming material. This is advantageous for an environment protection, and reduces the coating cost.

It is another object of the present invention to provide a producing process of the above-described type, which is capable of easily mass-producing a bumper of the above-described construction.

To achieve the above object, according to the present invention, there is provided a process for producing a bumper of synthetic resin for use in an automobile, the bumper including a core and an outer layer covering the core, the process comprising the steps of preparing a core forming material that includes a main component produced by pulverizing a recovered bumper which has been formed using a polyolefin-based resin composition modified by an olefinic elastomer and which has a thermosetting synthetic resin coating film on its surface, and a polyethylene added to the main component, and an outer layer forming material that includes a polyolefin-based resin composition modified by an olefinic elastomer and the polyethylene in a content $A_2$ which is in a relationship of $A_2 < A_1$ to the content $A_1$ of the polyethylene in the core forming material; injecting the outer layer forming material through a feed channel into a bumper molding cavity in a mold; injecting the core forming material to flow into the outer layer forming material located in the feed channel and the cavity, allowing the outer layer forming material and core forming material to flow within the cavity; and pushing the outer layer forming material and core forming material located in the feed channel into the cavity by the outer layer forming material to form the core and the outer layer.

In addition, according to the present invention, there is provided A process for producing a bumper of synthetic resin for use in an automobile, the bumper including a core and an outer layer covering the core, the process comprising the steps of preparing a core forming material that includes a main component produced by pulverizing a recovered bumper which has been formed using a polyolefin-based resin composition modified by an olefinic elastomer and which has a thermosetting synthetic resin coating film on its surface, and a polyethylene added to the main component, and an outer layer forming material that includes a polyolefin-based resin composition modified by an olefinic elastomer and the polyethylene in a content $A_2$ which is smaller than a $A_1$ of the polyethylene in the core forming material ($A_2<A_1$); filling a feed channel leading to a bumper molding cavity in a mold with the outer layer forming material, and in such filled state, injecting the outer layer and core forming materials through a feed channel toward the cavity, thereby forming a forming material flow of a double structure in which a tip end portion of the flow is formed from the outer layer forming material and in an area in rear of the tip end portion, the core forming material is disposed on an inner side and the outer layer forming material is disposed on an outer side, and allowing the forming material flow of the double structure to flow within the cavity; and pushing the outer layer forming material and core forming material located in the feed channel into the cavity by the outer layer forming material to form the core and the outer layer.

According to such processes, it is possible to easily mass-produce a bumper of the above-described construction. After one run of the molding operation, the feed channel is filled up with the outer layer forming material and hence, a next run of the molding operation is smoothly started. In this run, the core forming material cannot be mixed with the outer layer forming material and therefore, disadvantages, such as degradation in impact resistance, heat-resisting characteristic and the like of the outer layer and a reduction in surface properties, are avoided.

Further, in pushing the outer layer forming material and core forming material located in the feed channel into the cavity by the outer layer forming material at the final step, the pushing is carried out reliably, thereby permitting the outer layer forming material to enter the cavity. Therefore, the entire core is completely covered with the outer layer. Thus, the core including the coating film particles is not exposed at all to the bumper surface and hence, the surface properties are improved and in its turn, the coating film formed on the surface of the outer layer is smoothed.

The above objects, features and advantages of the present invention will become apparent from the following description of the preferred embodiments taken in conjunction with the accompanying drawings.

DESCRIPTION OF THE PREFERRED EMBODIMENT

Figure 1:
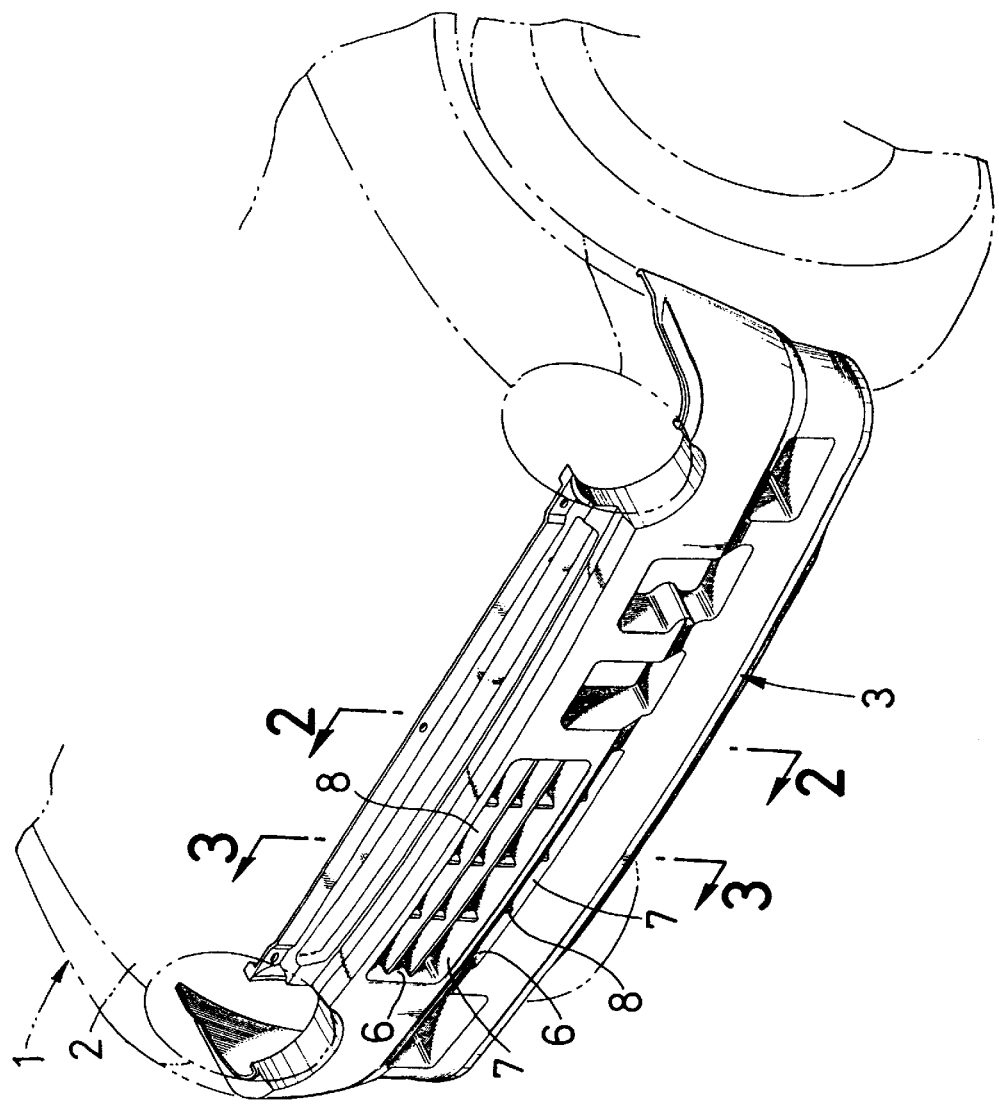
FIG. 1 is a perspective view of a front portion of an automobile including one embodiment of a bumper according to the present invention.
Figure 2:
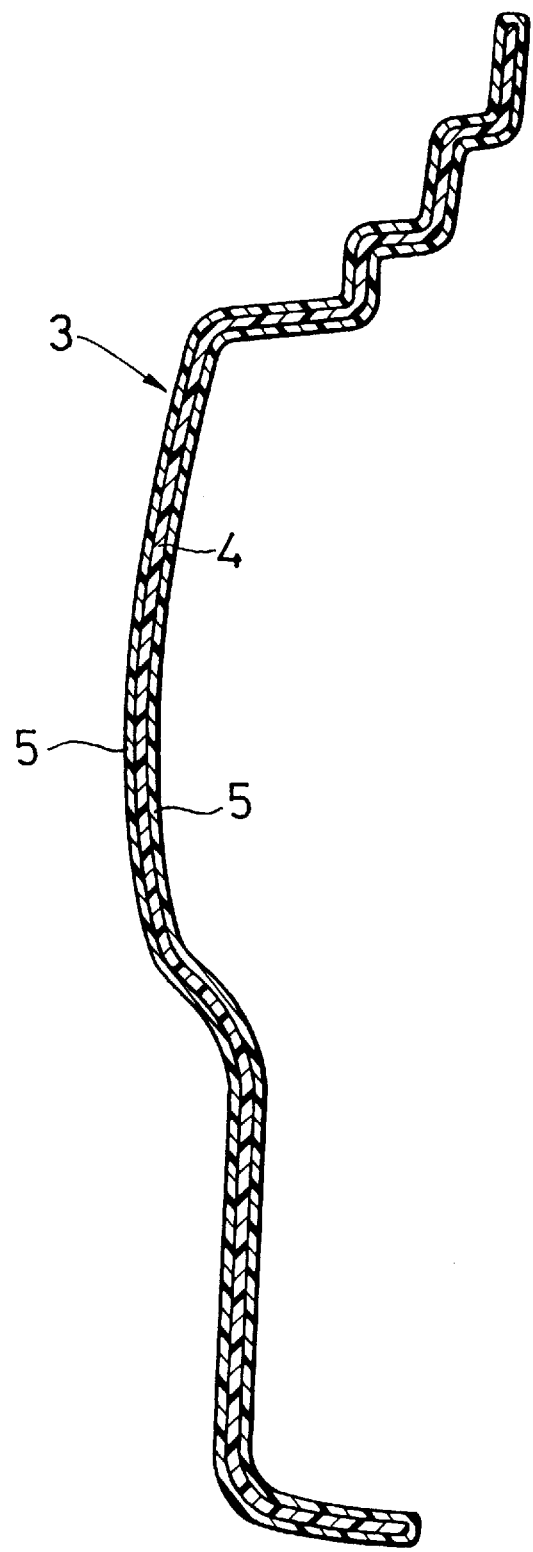
FIG. 2 is a sectional view taken along a line 2—2 in FIG. 1.
Figure 3:
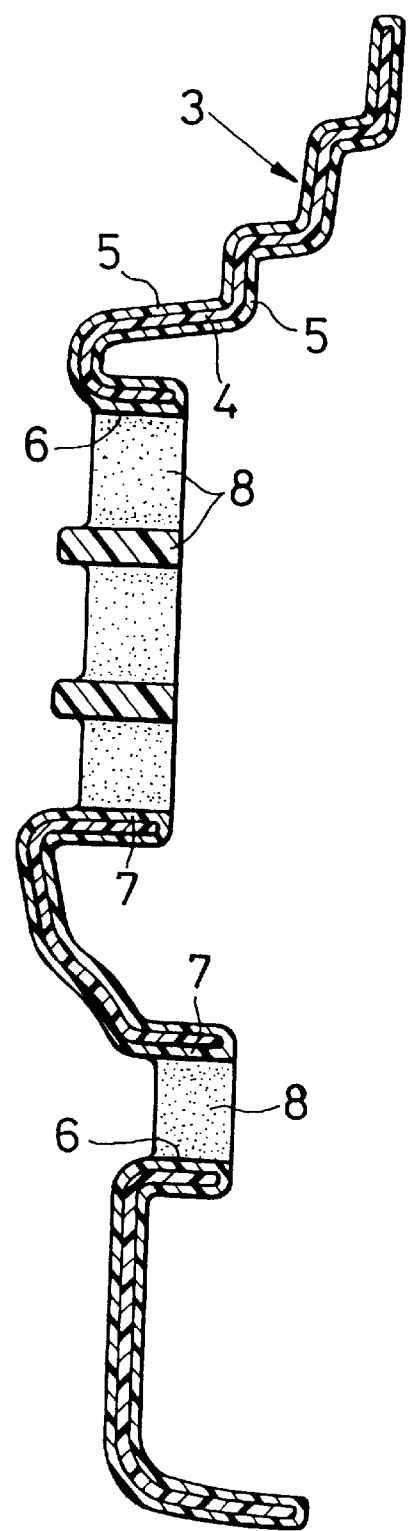
FIG. 3 is a sectional view taken along a line 3—3 in FIG. 1.

Referring to FIG. 1, a bumper 3 made of a synthetic resin is mounted at a front portion of an automobile body 2 of an automobile 1. The bumper 3 is formed of a core 4 and an outer layer 5 covering the core 4, as shown in FIGS. 2 and 3.

A material for forming the core 4 includes a main component that is produced by pulverizing a recovered bumper which has been formed using a polyolefin-based resin composition modified by an olefinic elastomer and which has a thermosetting synthetic resin coating film on a surface thereof, and a polyethylene added to the main component.

A material for forming the outer layer 5 includes a polyolefin-based resin composition modified by an olefinic elastomer, and the polyethylene in a content $A_2$ which is in smaller than a content $A_1$ of the polyethylene in the core-forming material ($A_2<A_1$).

For the bumper 3, if the polyethylene is added to the main component of the core-forming material, the polyethylene exhibits a good compatibility with the olefinic elastomer and hence, the olefinic elastomer is reinforced. This makes it possible to enhance the impact resistance of the core 4, despite the inclusion of coating film particles.

In this case, because the polyethylene is low in heat resistance, the heat resisting characteristic of the core 4 is damaged with the addition of the polyethylene, but this is compensated by the outer layer 5 including the polyethylene in the smaller content and having an excellent heat resisting characteristic.

Thus, the bumper 3 has an excellent impact resistance and an excellent heat resisting characteristic.

A polyolefin-based resin composition, which ensures that in coating the surface of the outer layer formed from this polyolefin-based resin composition, the surface of the outer layer is not required to be subjected to a degreasing by an organic solvent such as 1,1,1-trichloroethane and the like and, can be selected as the outer layer forming material. This is convenient for the environment protection, and also reduces the coating cost.

As the polyolefin-based resin composition for the materials for forming the core and the outer layer, a polypropylene or other material including a polyethylene as a main component may be used.

One material or two or more materials selected from the group consisting of an ethylene-propylene rubber (EPR), a low-density polyethylene, a poly (4-methylpentene-1), a polybutene, an ethylene-butene rubber, an ethylene-propylene-diene-terpolymer (EPDM) and the like may be used as the olefinic elastomer.

The content $A_1$ of the polyethylene in the core forming material is set in a range 3% by weight $\leq A_1 \leq 22\%$ by weight. However, if $A_1 < 3\%$ by weight, a poor polyethylene adding effect is obtained. On the other hand, if $A_1 > 22\%$ by weight, the heat resisting characteristic of the resulting core 4 is too low, which cannot be compensated by the outer layer 5.

Examples of the polyethylene which may be used are a high-density polyethylene (HDPE), a low-density polyethylene (LDPE), a linear low-density polyethylene (LLDPE) and the like. Among them, a polyethylene having a melt flow index MFI (JIS K6760) in a range of 0.01 g/10 min $\leq$ MFI $\leq$ 50 g/10 min is used. More preferably, a polyethylene having a melt flow index MFI in a range of 0.2 g/10 min $\leq$ MFI $\leq$ 25 g/10 min is used.

In the core forming material, for example, a two-pack urethane coating material is used as the thermosetting synthetic resin coating material, and the average particle diameter d of coating particles produced by pulverizing the urethane coating film is set in a range of d $\leq$ 0.3 mm. If the coating particles are finely divided in this manner, the adhesion property of the coating particles to the resin matrix is improved and hence, the impact resistance of the core 4 can be enhanced. However, d>0.3 mm, the adhesion property of the coating film particles to the resin matrix is deteriorated.

As best shown in FIGS. 1 and 3, the bumper 3 includes two windows 6 passing through the outer layer 5 and the core 4, and thin grills 8 located within the windows 6 and integral with inner peripheral portions 7 of the windows. The grill 8 is formed from the outer layer forming material. Because the outer layer forming material has an excellent impact resistance and an excellent heat resisting characteristic and is free from the coating particles, a mechanical strength and a physical strength of the grill can be insured by forming the grill 8 from the outer layer forming material. The window 6 functions as a cooling air inlet of a radiator for an engine.

Figure 4:
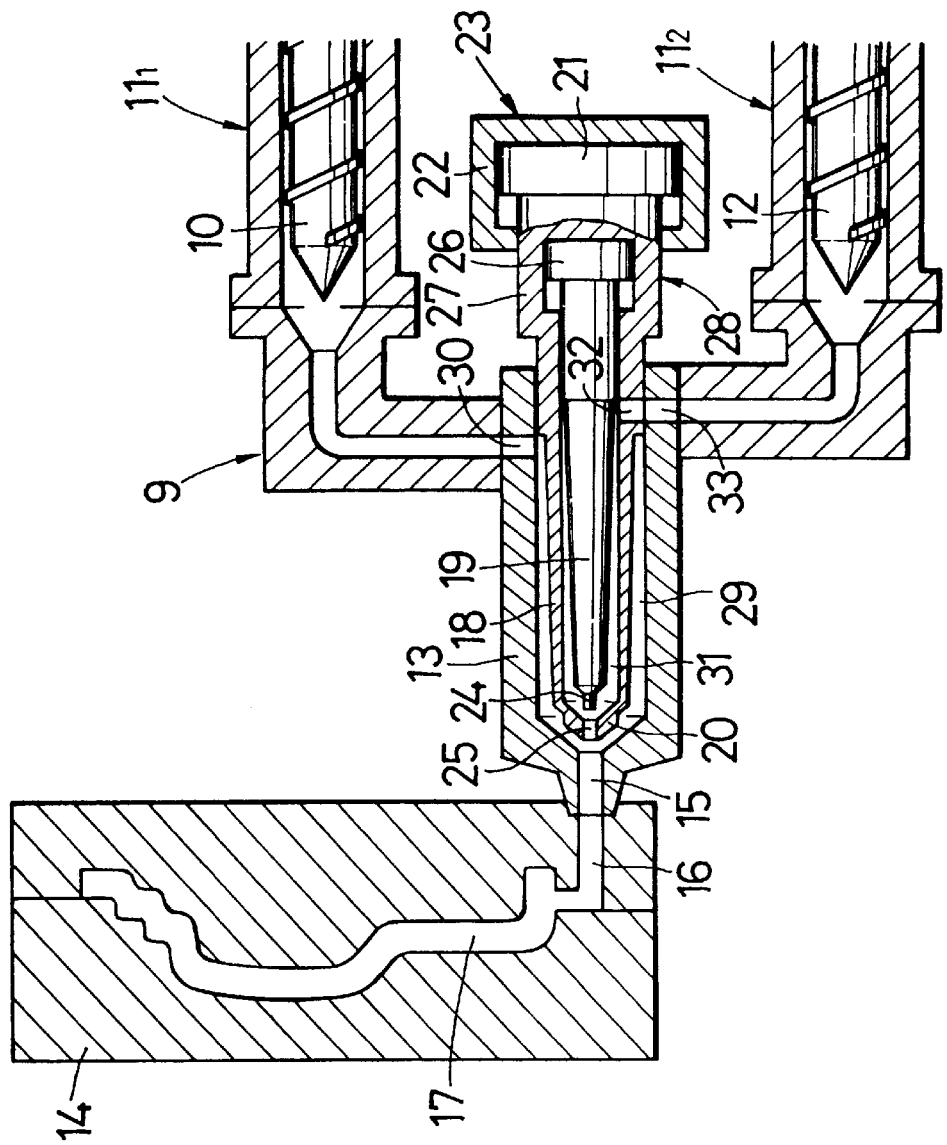
FIG. 4 is a sectional view of an essential portion of one example of an injection molding apparatus.

Referring to FIG. 4, an injection molding apparatus used for producing the bumper 4 includes a first injection unit $11_1$ having a screw 10 for injecting an outer layer forming material, a second injection unit $11_2$ having a screw 12 for injecting a core forming material, a nozzle 13 which interconnects both the injection units $11_1$ and $11_2$, and a split mold 14 attachable to and detachable from the nozzle 13.

A feed channel 15 in the nozzle 13 is in communication with a gate 16 in the mold 14. The gate 16 is in communication with a bumper molding cavity 17.

A hollow outer needle 18 and a solid inner needle 19 are concentrically disposed in the nozzle 14. In the outer needle 18, a valve portion 20 at a tip end of the outer needle 18 is opposed to the feed channel 15, and a piston 21 at a base end of the outer needle 18 is slidably received in a cylinder 22. The piston 21 and the cylinder 22 constitute a feed channel opening/closing mechanism 23. In the inner needle 19, a valve portion 24 at a tip end of the inner needle 19 is opposed to a valve bore 25 defined in the valve portion 20 of the outer needle 18, and a piston 26 at a base end of the inner needle 19 is slidably received in a cylinder 27 defined at the base end of the outer needle 18. The piston 26 and the cylinder 27 constitute a valve bore opening/closing mechanism 28.

The outer needle 18 has a tapered outer peripheral surface connected to the valve portion 20, and an outer passage 29 is defined between such tapered outer peripheral surface and an inner peripheral surface of the nozzle 13. The outer passage 29 is adapted to communicate at one end with the feed channel 15 and at the other end with the first injection unit $11_1$ via a through-hole 30 in the nozzle 13. The outer needle 18 has a straight outer peripheral surface at its base end, so that the through-hole 30 can be closed by such outer peripheral surface.

The inner needle 19 has a tapered outer peripheral surface connected to the valve portion 24, and an inner passage 31 is defined between such tapered outer peripheral surface and an inner peripheral surface of the outer needle 18. The inner passage 31 is adapted to communicate at one end with the valve bore 25 and at the other end with the second injection unit $11_2$ via through-holes 32 and 33 in the outer needle 18 and the nozzle 13. The inner needle 19 has a straight outer peripheral surface at its base end, so that the through-hole 32 can be closed by such outer peripheral surface.

A particular example of production of the bumper 3 using the above-described injection molding apparatus 9 will be described below.

A. Preparation of Core Forming Material

A recovered bumper which was produced in a molding process using a polypropylene modified by an ethylene-propylene rubber and which had a two-pack urethane coating film on a surface thereof was selected. The composition of the recovered bumper (excluding the coating film) was as follows.

Polypropylene 61% by weight
Ethylene-propylene rubber 30% by weight
Talc 7% by weight
Polyethylene 2% by weight The polyethylene in this composition was produced when the ethylene-propylene rubber was synthesized and hence, originally included in the ethylene-propylene rubber.

The recovered bumper was thrown into a pulverizing machine, where it was pulverized to provide a main component, and a polyethylene (HFPE made by Showa Denko, Corp. under a trade name of SHOLEX A520) was added in an amount of 5% by weight to the main component. Then, the mixture of the main component and the polyethylene was thrown into a granulating machine, where it was subjected to a melting/kneading, and the molten/kneaded mixture was passed through a filter of 80 to 100 meshes to remove bulky particles. Thereafter, the molten/kneaded mixture was passed through a fine tube having an inside diameter of about 1 mm, so that it was formed into a linear product. Further, the linear product was cut into a length of 1 to several mm to provide a pellet-like core forming material. The content $A_1$ of the polyethylene in this core forming material was of 6.9% by weight, and the average particle diameter d of the coating particles was of 0.22 mm.

B. Preparation of Outer Layer Forming Material

To provide the same composition as that of the recovered bumper (excluding the coating film), a mixture comprising polypropylene 61% by weight ethylene-propylene rubber 30% by weight talc 7% by weight polyethylene 2% by weight was thrown into a granulating machine to produce a pellet-like outer layer forming material in the same manner as the method described in the above-described item A.

The polyethylene in this composition was likewise a polyethylene produced when the ethylene-propylene rubber was synthesized. The content $A_2$ (2%by weight) of thepolyethylene in the outer layer forming material and the content $A_1$ (6.9% by weight) of the polyethylene in the core forming material are in a relationship of $A_2<A_1$.

(i) In FIG. 4, the outer layer forming material was placed into the first injection unit $11_1$ and maintained in a molten state, and the core forming material was placed into the second injection unit $11_2$ and maintained in a molten state.

Figure 5A:
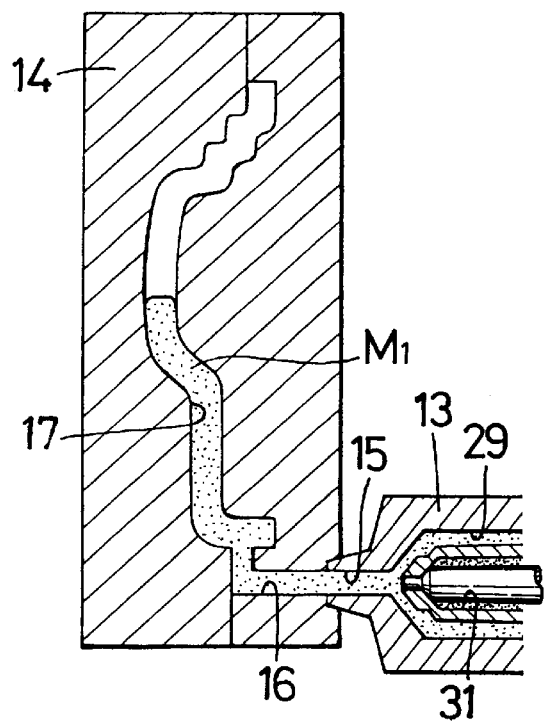
FIG. 5A is a view illustrating the injection molding apparatus at a first step.

(ii) As shown in FIG. 5A, when the outer passage 29 was in its opened state and the inner passage 31 was in its closed state, the outer layer forming material $M_1$ was injected into the bumper molding cavity 17 in the mold 14 through the feed channel 15 and the gate 16 under operation of the first injection unit $11_1$.

Figure 5B:
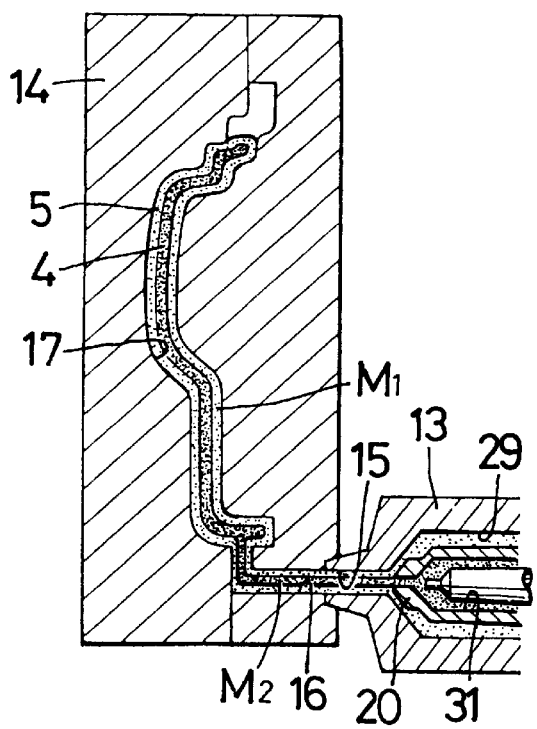
FIG. 5B is a view illustrating the injection molding apparatus at a second step.

(iii) As shown in FIG. 5B, a portion of the outer passage 29 closer to the feed channel 15 was constricted by the valve portion 20 under operation of the first injection unit $11_1$, and when the inner passage 31 is in its opened state, the core forming material $M_2$ was injected under operation of the second injection unit $11_2$ to flow into the outer layer forming material $M_1$ in the feed channel 15, the gate 16 and the cavity 17, and the outer layer forming material $M_1$ and the core forming material $M_2$ were allowed to flow within the cavity 17. Then, the operation of the injection unit $11_2$ was stopped.

Figure 5C:
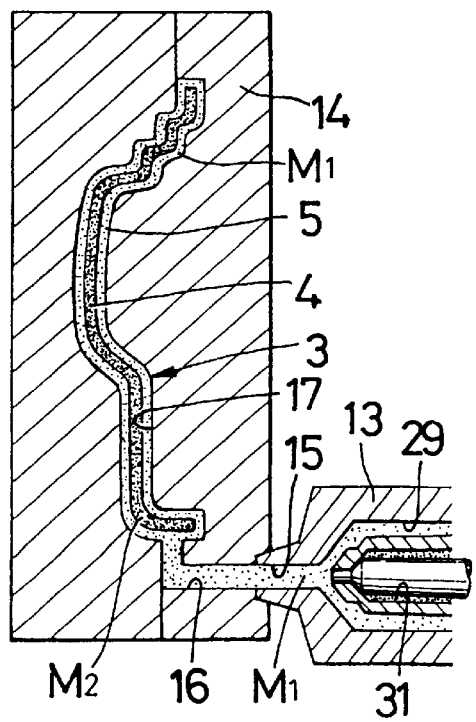
FIG. 5C is a view illustrating the injection molding apparatus at a third step.

(iv) As shown in FIG. 5C, when the outer passage 29 was in its opened state and the inner passage 31 was in its closed state, the outer layer forming material $M_1$ and the core forming material $M_2$ located in the feed channel 15 and the gate 16 were pushed into the cavity 17 by the outer layer forming material $M_1$ under operation of the first injection unit $11_1$, thereby forming a core and an outer layer 5. Then, the operation of the first injection unit $11_1$ was stopped.

(v) When the outer and inner passages 29 and 31 were in their closed states, the mold 14 is separated from the nozzle and then, the mold was opened to provide a bumper 3. This bumper 3 is called an example 1.

In the above-described producing process, the grill forming portion of the cavity 17 is filled with the outer layer forming material $M_1$ in the step (ii). In this case, the flowing of the core forming material $M_2$ into the outer layer forming material $M_1$ in the grill shaping portion is prevented, because the grill shaping portion is formed at a small width, as the grill 8 is thin.

According to the above-described producing process, it is possible to easily mass-produce the bumper 3 of the above-described construction. The inside of the feed channel 15 is filled up with the outer layer forming material $M_1$ after one run of the molding operation, and therefore, the next run of the molding operation is smoothly started. In this run, the core forming material $M_2$ cannot be mixed with the outer layer forming material $M_1$ and hence, disadvantages are avoided such as the degradation of the impact resistance, the heat resisting characteristic and the like of the outer layer 5, the reduction in surface properties and the like.

When the core forming material $M_2$ within the feed channel 15 and the gate 16 is pushed into the cavity 17 by outer layer forming material $M_1$ at the final process, such pushing is reliably conducted and hence, a portion of the outer layer forming material $M_1$ enters the cavity 17 and as a result, the entire core 4 is completely covered with the outer layer 5. Thus, the core 4 including the coating particles is not exposed at all to the surface of the bumper 3, resulting in improved surface properties and in its turn, providing a smoothed coating film formed on the surface of the outer layer 5.

For comparison, using the above-described injection molding apparatus 9, various bumpers were produced from varied forming materials.

Table 1 shows forming materials in comparative examples 1 to 3.

TABLE 1

| | Outer layer | core |
|---|---|---|
| Comparative example 1 | Outer layer forming material | |
| Comparative example 2 | Outer layer forming material | Core forming material with no polyethylene added thereto |
| Comparative example 3 | Core forming material | |

Various test pieces were fabricated from the bumpers in the example 1 and the comparative examples 1 to 3, and were subjected to a tensile test to judge the strength, a Dupont impact test to judge the impact resistance and further to a heat sag test to judge the heat resisting characteristic. Conditions for the test are as follows:

Tensile Test:

According to JIS K7113, a test piece, similar to JIS No. 2 test piece, having a thickness of 3 mm, a width of parallel portion of 10 mm, a length of parallel portion of 23 mm and a gauge length of 20 mm was retained for 4 hours or more in an atmosphere at −30° C. and then, the tensile elongation was measured at a test speed of 50 mm/min.

Dupont Impact Test:

According to JIS K6718, a test piece having a thickness of 3 mm was retained for 4 hours or more in an atmosphere at −30° C. and then, the impact value was measured.

Figure 6:
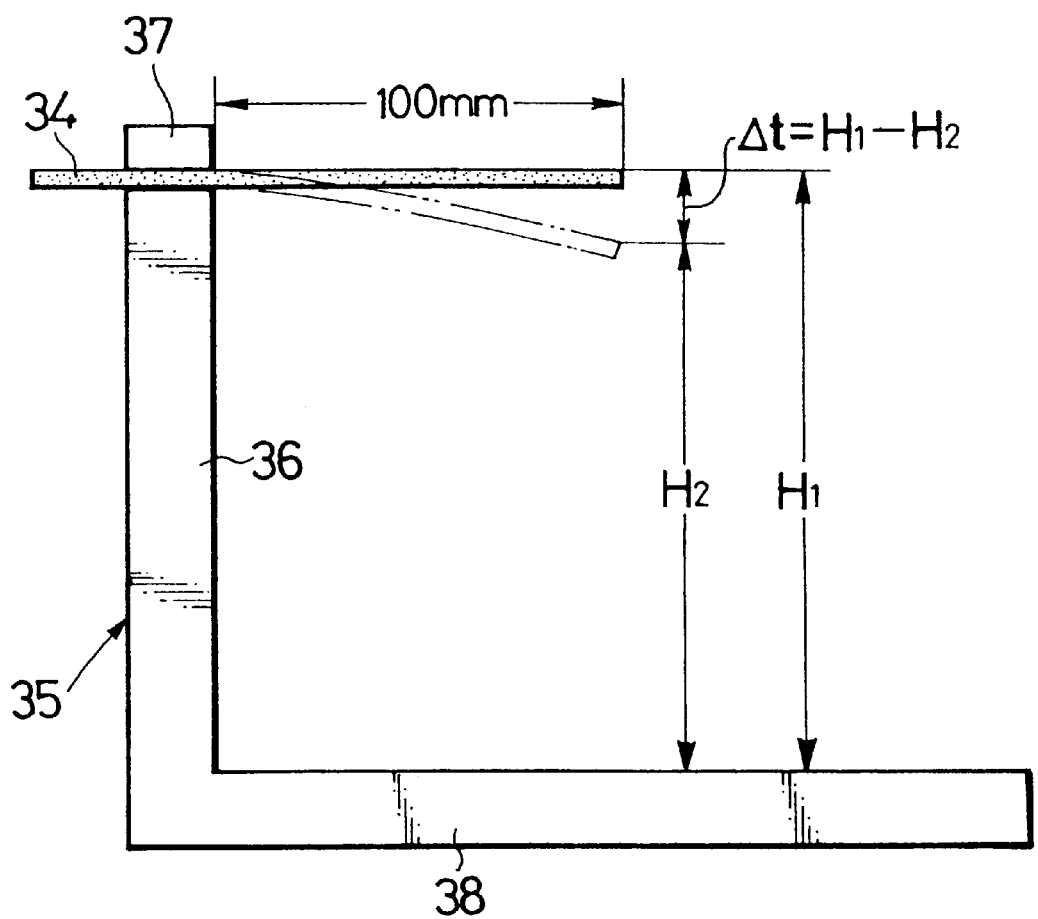
FIG. 6 is a view for explaining a heat-sag test.

Heat Sag Test:

As shown in FIG. 6, a test piece 34 having a width of 10 mm, a length of 150 mm and a thickness of 3 mm was cantilever-supported on an upper end face of a vertical portion 36 of an L-shaped fixture jig 35 using a retaining plate 37. In this case, the length of protrusion of the test piece 34 from the vertical portion 36 was set at 100 mm. First, the height $H_1$ from an upper surface of a horizontal portion 38 of the fixture jig 35 to an upper surface of a tip end of the test piece 34 was measured and then, the test piece 34 was retained along with the jig 35 for 60 minutes in a constant temperature bath at 80° C. Thus, a heat sagging of the test piece 34 was caused as shown by a dashed line in FIG. 6 and hence, the height $H_2$ from the upper surface of the horizontal portion 38 to the upper surface of the test piece 34 at its tip end was measured to determined a heat sag value $\Delta t$ (=$H_1$–$H_2$).

Table 2 shows results of the tests for the example 1 and the comparative examples 1 to 3.

TABLE 2

|  | Tensile elongation (%) | Dupont impact value (kgf · cm) | Heat sag value Δt (mm) |
|---|---|---|---|
| Example 1 | 100 | 300 (not cracked) | 2.4 |
| Comparative example 1 | 100 | 300 (not cracked) | 2.4 |
| Comparative example 2 | 60 | 120 (cracked) | 2.4 |
| Comparative example 3 | 80 | 200 (cracked) | 3.5 |

It can be seen from Tables 1 and 2 that the example 1 has characteristics equivalent to a product made using a virgin resin as a forming material and having an excellent strength, an excellent impact resistance and an excellent heat resisting characteristic.

In the comparative example 2, particularly, the impact resistance is low due to no polyethylene added to the core forming material. In the comparative example 3, particularly, the heat resisting characteristic is poor, because the bumper of the comparative example 3 was formed from only the core forming material.

Table 3 shows physical properties of various polyethylenes used in the core forming material. The tradename in Table 3 is of a product made by Showa Denko, Corp.

Tables 4 to 6 show the trade name of the polyethylenes in the core forming material, and the amount of polyethylene added to the main component and the content $A_1$ of the polyethylene. The composition of the recovered bumper for producing the main component is the same as described above.

TABLE 4

|  | Core forming material | | | |
|---|---|---|---|---|
|  | Example 1 | Example 2 | Example 3 | Example 4 |
| Trade name of polyethylene | SHOLEX A5220 | | | SHOLEX A5080 |
| Amount of polyethylene added to main component (% by weight) | 5 | 7.5 | 10 | 5 |
| Content $A_1$ (% by weight) | 6.9 | 9.35 | 11.8 | 6.9 |

TABLE 5

|  | Core forming material | |
|---|---|---|
|  | Example 5 | Example 6 |
| Trade name of polyethylene | SHOLEX A5020 | |
| Amount of polyethylene added to main component (% by weight) | 7.5 | 10 |
| Content $A_1$ (% by weight) | 9.35 | 11.8 |

TABLE 6

|  | Core forming material | | | |
|---|---|---|---|---|
|  | Example 7 | Example 8 | Example 9 | Example 10 |
| Trade name of polyethylene | SHOLEX S4503H | SHOLEX M134 | SHOLEX A315J | SHOLEX A207J |
| Amount of polyethylene added to main component (% by weight) | 5 | 5 | 5 | 5 |

TABLE 3

| | Type of polyethylene | | | | | | |
|---|---|---|---|---|---|---|---|
| | HDPE | | | | LDPE | LLDPE | |
| Trade name | SHOLEX A5220 | SHOLEX A5080 | SHOLEX A5020 | SHOLEX S4503H | SHOLEX M134 | SHOLEX A315J | SHOLEX A207J |
| MFI (g/10 min) | 20 | 7.5 | 2.4 | 0.30 | 3.0 | 15 | 7.0 |
| Density (g/cm³) | 0.952 | 0.948 | 0.946 | 0.943 | 0.921 | 0.928 | 0.920 |
| Flexural modulus of elasticity (kg f/cm²) | 12500 | 11500 | 11000 | 10900 | 2000 | 4900 | 3200 |
| Vicat softening point (° C.) | 124 | 125 | 125 | 126 | 95 | 103 | 100 |

TABLE 6-continued

| | Core forming material | | | |
|---|---|---|---|---|
| | Example 7 | Example 8 | Example 9 | Example 10 |
| Content $A_1$ (% by weight) | 6.9 | 6.9 | 6.9 | 6.9 |

Table 7 shows results of the tests for bumpers of examples 2 to 11 produced in the same process as that described above, using the examples 1 to 10 shown in Tables 4 to 6 and the same outer layer forming materials as those described above. Conditions for the test are the same as those described above.

TABLE 7

| Example No. | Core forming material | Tensile elongation (%) | Dupont impact value (kgf · cm) | Heat sag value Δt (mm) |
|---|---|---|---|---|
| 2 | Example 1 | 108 | 300 (not cracked) | 2.4 |
| 3 | Example 2 | 101 | 300 (not cracked) | 2.4 |
| 4 | Example 3 | 105 | 300 (not cracked) | 2.4 |
| 5 | Example 4 | 111 | 300 (not cracked) | 2.4 |
| 6 | Example 5 | 102 | 300 (not cracked) | 2.4 |
| 7 | Example 6 | 105 | 300 (not cracked) | 2.4 |
| 8 | Example 7 | 100 | 300 (not cracked) | 2.4 |
| 9 | Example 8 | 105 | 300 (not cracked) | 2.4 |
| 10 | Example 9 | 110 | 390 (not cracked) | 2.4 |
| 11 | Example 10 | 117 | 300 (not cracked) | 2.4 |

As apparent from Table 7, each of the example 2 to 11 has characteristics equivalent to or more excellent that those of comparative example 1 shown in Table 2.

FIG. 7 illustrates another embodiment of a bumper producing process. An injection apparatus 9 used is substantially same as that described above, except that the cavity 17 has no grill shaping portion. In producing a bumper 3, following steps are carried out sequentially.

Figure 7A:
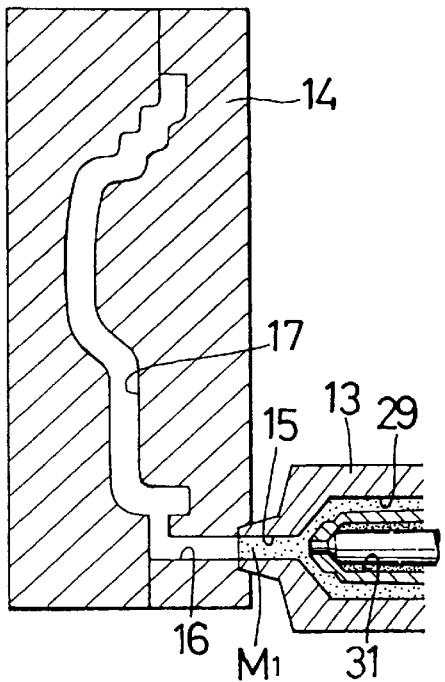
FIG. 7A is a view illustrating the injection molding apparatus at a first step.

(i) As shown in FIG. 7A, the outer passage 29 is in its opened state, while the inner passage 31 is in its closed state, and the inside of feed channel 15 is filled up with the outer layer forming material $M_1$ by the operation of the first injection unit $11_1$.

Figure 7B:
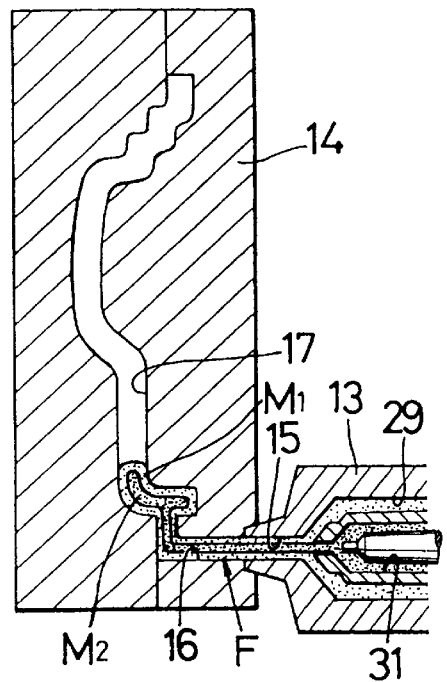
FIG. 7B is a view illustrating the injection molding apparatus at a second step.
Figure 7C:
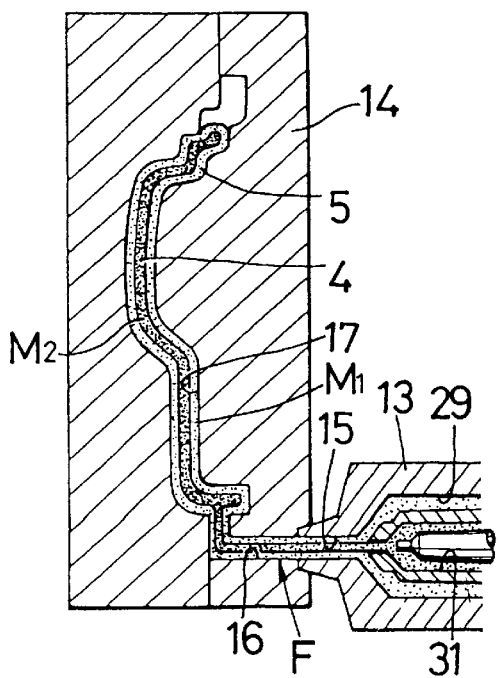
FIG. 7C is a view illustrating the injection molding apparatus at a third step.

(ii) As shown in FIGS. 7B and 7C, when both the outer and inner passages 29 and 31 are in their opened states, the outer layer forming material and the core forming material $M_2$ are injected through the feed channel 15 and the gate 16 into the cavity 17 under operation of the first and second injection units $11_1$ and $11_2$, thereby forming a forming material flow F of a double structure in which a tip end portion of the flow is formed from the outer layer forming material $M_1$, and in an area in rear of the tip end portion, the core forming material $M_2$ is disposed on an inner side and the outer layer forming material $M_1$ is disposed on an outer side. Then, the forming material flow F of such double structure is allowed to flow within the cavity 17.

Figure 7D:
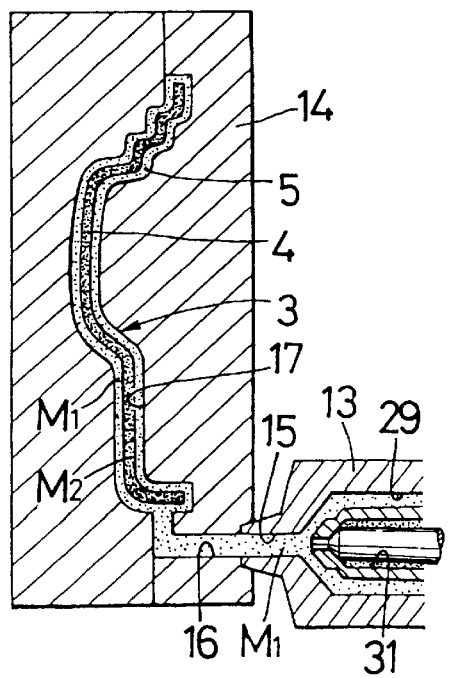
FIG. 7D is a view illustrating the injection molding apparatus at a fourth step.

(iii) As shown in FIG. 7D, when the outer passage 29 is in its opened state, while the inner passage 31 is in its closed state, the operation of the second injection unit $11_2$ is stopped, the outer layer and core forming materials $M_1$ and $M_2$ located within the feed channel 15 and the gate 16 are pushed into the cavity 17 by the outer layer forming material $M_1$ under operation of the first injection unit $11_1$, thereby forming a core 4 and an outer layer 5. Then, the operation of the first injection unit $11_1$ is stopped.

(iv) When the outer and inner passages 29 and 31 are in their closed states, the mold 14 is separated from the nozzle 13 and then, the mold is opened, thereby providing a bumper 3 having no grill 8.

Figure 8:
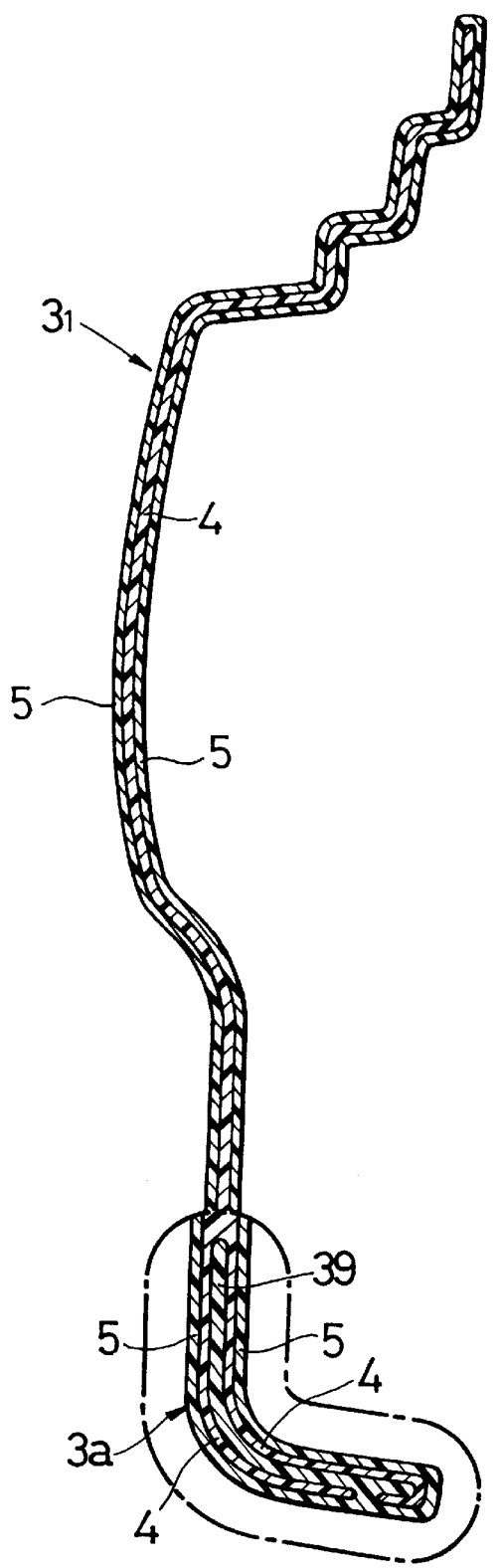
FIG. 8 is a partially enlarged sectional view similar to FIG. 2, but illustrating another embodiment of a bumper according to the present invention.

FIG. 8 illustrates another embodiment of a bumper $3_1$ made of a synthetic resin. This bumper $3_1$ has a grill 8 which is not shown. In an L-shaped lower folded area 3a of the bumper $3_1$, a reinforcing layer 39 is formed within a core 4. The reinforcing layer 39 is formed from the same material as the material for forming an outer layer 5.

With such construction, it is possible to enhance the mechanical strength, particularly, the tensile strength of the lower folded area 3a, thereby providing a bumper $3_1$ made of the synthetic resin having characteristics which satisfy the requirements for the lower folded area 3a.

Figure 9:
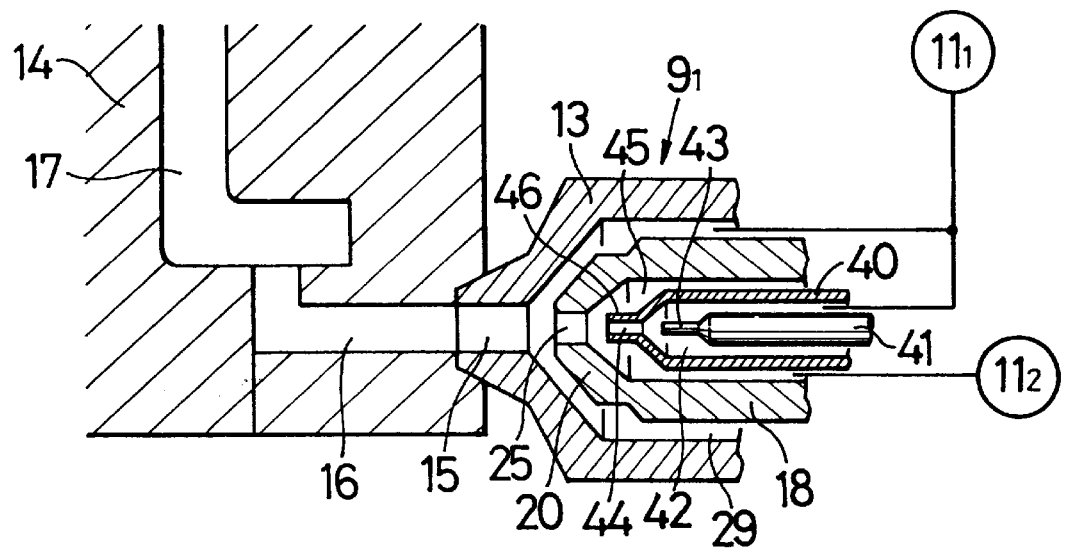
FIG. 9 is a sectional view of an essential portion of another example of an injection molding apparatus.

FIG. 9 illustrates an essential portion of an injection molding apparatus 91 used for producing the bumper 3. This apparatus $9_1$ has a construction in which the inner needle 19 in the apparatus 9 shown in FIG. 4 is replaced by a hollow intermediate needle 40 and a solid inner needle 41 which are disposed concentrically.

An inner passage 42 is defined between the intermediate and inner needles 40 and 41. On end of the inner passage 42 adjacent the feed channel 15 is put out of communication with the feed channel 15 by fitting a valve portion 43 at a tip end of the inner needle 41 into the valve bore 44 at a tip end of the intermediate needle 40. The other end of the inner passage 42 is adapted to be put into communication with the first injection unit $11_1$ (see FIG. 4).

An intermediate passage 45 is defined between the outer and intermediate needles 18 and 40. One end of the intermediate passage 45 adjacent the feed channel 15 is put out of communication with the feed channel 15 by fitting a valve portion 46 having a valve bore 44 in the intermediate needle 40 into the valve bore 25 in the outer needle 18 in a condition in which the valve portion 43 of the inner needle 41 has been fitted into the valve bore 44 in the intermediate needle 40. The other end of the intermediate passage 45 is adapted to be put into communication with the second injection unit $11_1$ (see FIG. 4).

The other constructions in the injection molding apparatus $9_1$ shown in FIG. 9 are substantially the same as those in the above-described apparatus 9 and hence, portions or components corresponding to those in the apparatus 9 are designated by like reference characters.

In the production of the bumper $3_1$, following steps are carried out sequentially.

(i) An outer layer forming material is retained in a molten state in the first injection unit $11_1$ shown in FIGS. 4 and 9, and a core forming material is retained in a molten state in the second injection unit $11_2$.

Figure 10A:
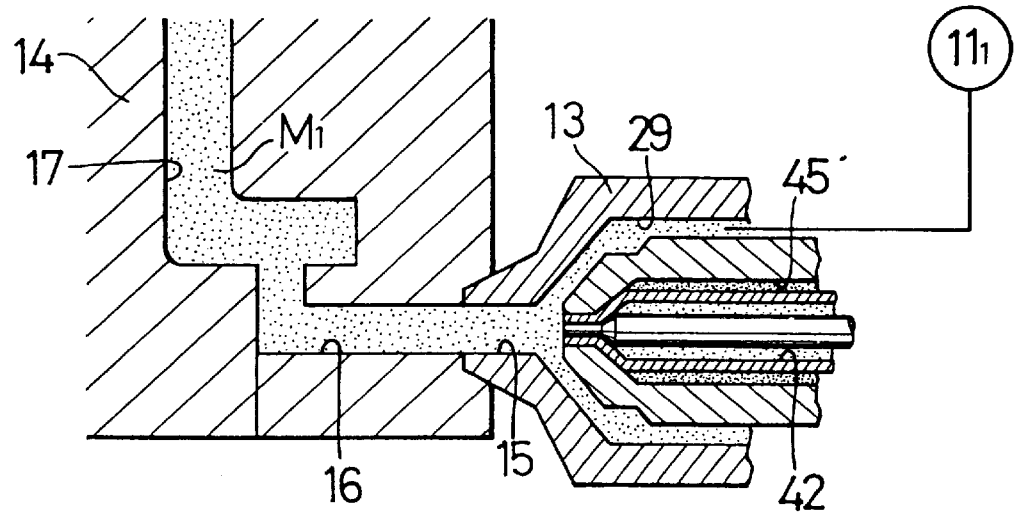
FIG. 10A is a view illustrating the injection molding apparatus at a first step.

(ii) As shown in FIG. 10A, when the outer passage 29 is in its opened state, while the intermediate and inner passages 45 and 42 are in their closed states, the outer layer forming material $M_1$ is injected through the feed channel 15 and the gate 16 into the bumper molding cavity 17 under operation of the first injection unit $11_1$.

Figure 10B:
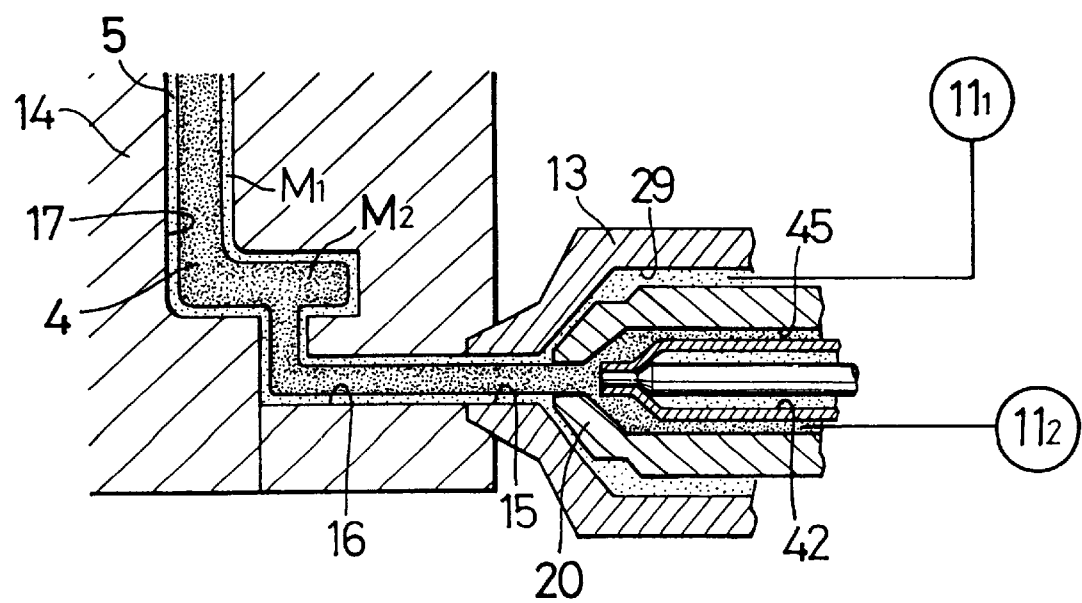
FIG. 10B is a view illustrating the injection molding apparatus at a second step.

(iii) As shown in FIG. 10B, when the outer passage 29 is constricted at its portion adjacent the feed channel 15 by the valve portion 20 under operation of the first injection unit $11_1$, and when the inner passage 42 is in its closed state, while the intermediate passage 45 is in its opened state, the core forming material $M_2$ is injected under operation of the second injection unit $11_1$ to flow into the outer layer forming material 29 $M_1$ in the feed channel 15, the gate 16 and the cavity 17, and the outer layer forming material and core forming material $M_1$ and $M_2$ are allowed to flow within the cavity 17.

Figure 10C:
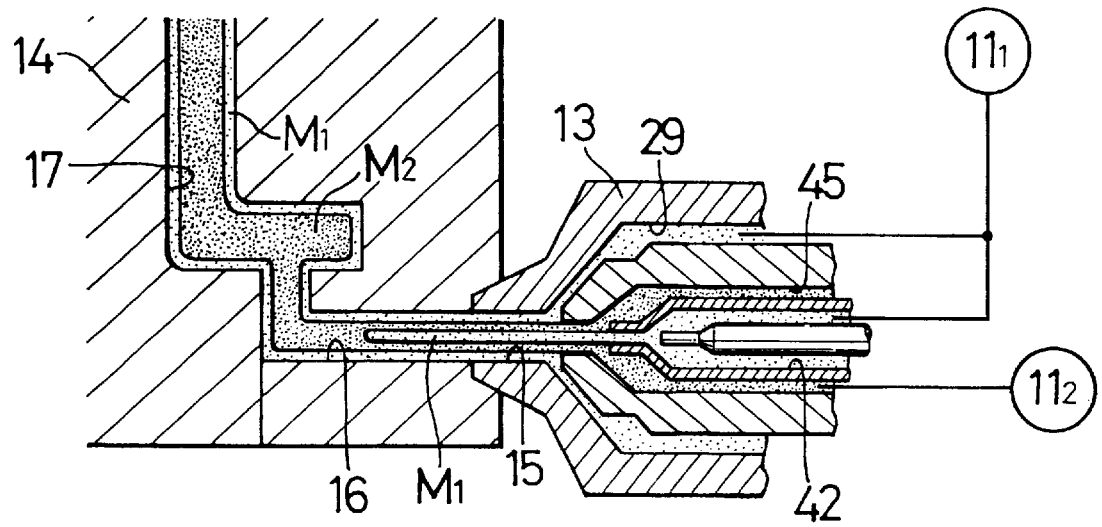
FIG. 10C is a view illustrating the injection molding apparatus at a third step.

(iv) As shown in FIG. 10C, when the outer, intermediate and inner passages 29, 45 and 42 are in their opened states, the outer layer forming material $M_1$ for forming the reinforcing layer 39 is injected under operation of the first injection unit $11_1$ to flow into the core forming material $M_2$ in the feed channel 15 and the gate 15. In this case, the second injection unit $11_2$ is in operation.

Figure 10D:
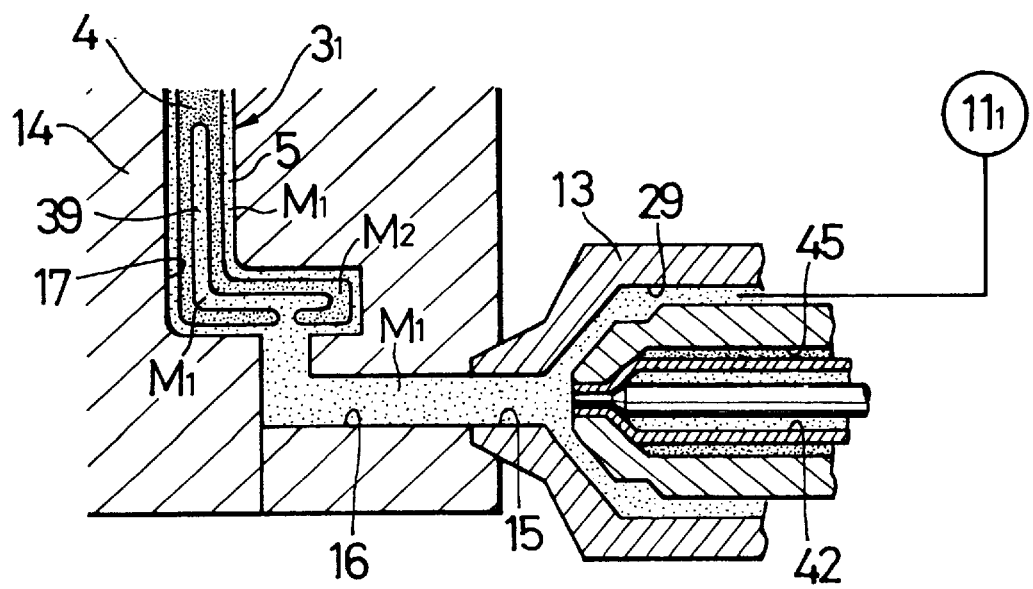
FIG. 10D is a view illustrating the injection molding apparatus at a fourth step.

(v) As shown in FIG. 10D, the operation of the second injection unit $11_2$ is stopped, and when the outer passage 29 is in its opened state, while the intermediate and inner passages 45 and 42 are in their closed states, the outer layer forming material and core forming material $M_1$ and $M_2$ located in the feed channel 15 and the gate 16 are pushed into the cavity 17 by the outer layer forming material $M_1$ under operation of the first injection unit $11_1$ to form a core 4, an outer layer 5 and a reinforcing layer 39. Then, the first injection unit $11_1$ is stopped.

(vi) When the outer, intermediate and inner passages 29, 45 and 42 are in their closed states, the mold 14 is separated from the nozzle 13 and then opened to provide a bumper $3_1$ having a grill 8.

In producing a bumper $3_1$ having no grill 8, but having a reinforcing layer 39 using the injection molding apparatus $9_1$, a following procedure is employed.

(i) When the outer passage 29 is in its opened state, while the intermediate and inner passages 45 and 42 are in their closed states, the feed channel 15 is filled with the outer layer forming material $M_1$ by the operation of the first injection unit $11_1$.

(ii) When the outer and intermediate passages 29 and 45 are in their opened states, while the inner passage 42 is in its closed state, the outer layer forming material and core forming material $M_1$ and $M_2$ are injected through the feed channel 15 and the gate 16 toward the cavity 17 under operation of the first and second injection units $11_1$ and $11_2$, thereby forming a forming material flow F of a double structure in which a tip end portion of the flow is formed from the outer layer forming material $M_1$, and in an area in rear of the tip end portion, the core forming material $M_2$ is disposed on an inner side and the outer layer forming material $M_1$ is disposed on an outer side (see FIGS. 7B and 7C). Then, the forming material flow F of such double structure is allowed to flow within the cavity 17.

(iii) In the same manner as at the step shown in FIG. 10C, when the outer, intermediate and inner passages 29, 45 and 42 are in their opened states, the outer layer forming material $M_1$ for forming the reinforcing layer 3 is injected under operation of the first injection unit $11_1$ to flow into the core forming material $M_2$ in the feed channel 15 and the gate 16. In this case, the second injection unit $11_2$ is in operation.

(iv) In the same manner as at the step shown in FIG. 10D, the operation of the second injection unit $11_2$ is stopped, and when the outer passage 29 is in its opened state, while the intermediate and inner passages 45 and 42 are in their closed states, the outer layer forming material and core forming material $M_1$ and $M_2$ located in the feed channel 15 and the gate 16 are pushed into the cavity 17 by the outer layer forming material $M_1$ under operation of the first injection unit $11_1$ to form a core 4, an outer layer 5 and a reinforcing layer 39. Then, the operation of the first injection unit $11_1$ is stopped.

(v) When the outer, intermediate and inner passages 29, 45 and 42 are in their closed states, the mold 14 is separated from the nozzle 13 and then opened to provide a bumper $3_1$ having no grill 8.

In FIG. 7C, after closing the inner passage 31, the injection pressure in the outer passage 29 may be increased to permit the outer layer forming material $M_1$ to flow into the core forming material $M_2$, thereby forming a reinforcing layer 39.

What is claimed is:

1. A process for producing a bumper of synthetic resin for use in an automobile by injection molding, said bumper including a core and an outer layer covering and being integrally molded with the core, said process comprising the steps of:

pulverizing a recovered bumper which has been formed using a polyolefin-based resin composition modified by an olefinic elastomer and which has a thermosetting synthetic resin coating film on its surface, preparing 1) a core forming material by using said pulverized recovered bumper as a main component and adding a polyethylene to the main component, preparing 2) an outer layer forming material using a polyolefin-based resin composition modified by an olefinic elastomer and a polyethylene in a content $A_2$ which is smaller than a content $A_1$ of the polyethylene included in said core forming material ($A_2<A_1$);

injecting said outer layer forming material through a feed channel into a bumper molding cavity in a mold;

injecting said core forming material to flow into said outer layer forming material located in said feed channel and said cavity, and allowing said outer layer forming material and said core forming material to flow into said cavity; and pushing said outer layer forming material and said core forming material which are located in said feed channel into said cavity by said outer-layer forming material thereby to form said core and said outer layer.

2. A process for producing a bumper of synthetic resin for use in an automobile by injection molding, said bumper including a core and an outer layer covering and being integrally molded with the core, said process comprising the steps of:

pulverizing a recovered bumper which has been formed by using a polyolefin-based resin composition modified by an olefinic elastomer and which has a thermosetting synthetic resin coating film on its surface, preparing 1) a core forming material by using said pulverized recovered bumper as a main component and adding a polyethylene to the main component, preparing 2) an outer layer forming material using a polyolefin-based resin composition modified by an olefinic elastomer and a polyethylene in a content $A_2$ which is smaller than a content $A_1$ of the polyethylene included in said core forming material ($A_2<A_1$);

filling a feed channel, which leads to a bumper molding cavity in a mold, with said outer layer forming material, and in such filled state, injecting said outer layer forming material and said core forming material through said feed channel toward said cavity, thereby forming a forming material flow of a double structure in which a tip end portion of said flow is formed from said outer layer forming material and a portion of said flow rearward of the tip end portion is formed to have said core forming material at an inner side and said outer layer forming material at an outer side, and allowing said forming material flow of the double structure to flow into said cavity; and pushing said outer layer forming material and said core forming material which are located in said feed channel into said cavity by said outer layer forming material thereby to form said core and said outer layer.

3. A process for producing a bumper of synthetic resin for use in an automobile by injecting molding, said bumper being of an integrally molded structure including a core, an outer layer covering the core, and a lower folded area in which a reinforcing layer is formed within said core, said process comprising the steps of:

pulverizing a recovered bumper which has been formed by using a polyolefin-based resin composition modified by an olefinic elastomer and which has a thermosetting synthetic resin coating film on its surface, preparing 1) a core forming material by using said recovered bumper as a main component and adding a polyethylene to the main component, preparing 2) an outer layer forming material using a polyolefin-based resin composition modified by a olefinic elastomer and a polyethylene in a content $A_2$ which is smaller than a content $A_1$ of the polyethylene included in said core forming material ($A_2<A_1$);

injecting said outer layer forming material through a feed channel into a bumper molding cavity in a mold;

injecting said core forming material to flow into said outer layer forming material located in said feed channel and said cavity, and allowing the outer layer forming material and said core forming material to flow into said cavity;

injecting said outer layer forming material to flow into said core forming material for forming said reinforcing layer; and pushing said outer layer forming material and said core forming material which are located in said feed channel into said cavity by said outer layer forming material thereby to form said core, said outer layer and said reinforcing layer.

4. A process for producing a bumper of synthetic resin for use in an automobile by injection molding, said bumper being of an integrally molded structure including a core, an outer layer covering the core, and a lower folded area in which a reinforcing layer is formed within said core, said process comprising the steps of:

pulverizing a recovered bumper which has been formed by using a polyolefin-based resin composition modified by an olefinic elastomer and which has a thermosetting synthetic resin coating film on its surface, preparing 1) a core forming material by using said pulverized recovered bumper as a main component and adding a polyethylene to the main component, preparing 2) an outer layer forming material using a polyolefin-based resin composition modified by a olefinic elastomer and a polyethylene in a content $A_2$ which is smaller than a content $A_1$ of the polyethylene included in said core forming material ($A_2<A_1$);

filling a feed channel, which leads to a bumper molding cavity in a mold, with said outer layer forming material, and in such filled state, injecting said outer layer forming material and said core forming material through said feed channel toward said cavity, thereby forming a forming material flow of a double structure in which a tip end portion of said flow is formed from said outer layer forming material and a portion of said flow rearward of the tip end portion is formed to have said core forming material at an inner side and said outer layer forming material an outer side, and allowing said forming material flow of the double structure to flow into said cavity;

injecting said outer layer forming material to flow into said core forming material for forming said reinforcing layer; and pushing said outer layer forming material and said core forming material which are located in said feed channel into said cavity by said outer layer forming material thereby to form said core, said outer layer and said reinforcing layer.

* * * * *